US008850599B2

(12) United States Patent
Manchala et al.

(10) Patent No.: US 8,850,599 B2
(45) Date of Patent: Sep. 30, 2014

(54) METHOD FOR DOCUMENT PROCESSING

(75) Inventors: Daniel W. Manchala, Torrance, CA (US); Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1053 days.

(21) Appl. No.: 12/352,761

(22) Filed: Jan. 13, 2009

(65) Prior Publication Data
US 2010/0180345 A1 Jul. 15, 2010

(51) Int. Cl.
*H04N 7/16* (2011.01)
*G06F 21/10* (2013.01)

(52) U.S. Cl.
CPC ..................................... *G06F 21/10* (2013.01)
USPC ................... 726/27; 726/26; 726/31; 726/32; 726/33

(58) Field of Classification Search
CPC .. G06F 21/62; G06F 21/6209; G06F 21/6218
USPC ......................................... 726/26–27, 31–33
See application file for complete search history.

(56) References Cited

U.S. PATENT DOCUMENTS

| 4,977,594 | A | 12/1990 | Shear |
| 5,247,575 | A | 9/1993 | Sprague et al. |
| 5,629,980 | A | 5/1997 | Stefik et al. |
| 5,634,012 | A | 5/1997 | Stefik et al. |
| 5,715,403 | A | 2/1998 | Stefik et al. |
| 5,870,545 | A | 2/1999 | Davis et al. |
| 6,088,119 | A | 7/2000 | Manchala et al. |
| 6,236,971 | B1 | 5/2001 | Stefik et al. |
| 6,918,053 | B1 | 7/2005 | Thatte et al. |
| 6,937,993 | B1 * | 8/2005 | Gabbita et al. ............... 705/7.22 |
| 7,076,562 | B2 | 7/2006 | Singhal et al. |
| 7,103,351 | B2 | 9/2006 | Chaudhari et al. |
| 2003/0043402 | A1 | 3/2003 | Manchala et al. |
| 2004/0187022 | A1 * | 9/2004 | Asada et al. ................... 713/200 |
| 2005/0120201 | A1 * | 6/2005 | Benaloh et al. ............... 713/155 |
| 2005/0283605 | A1 * | 12/2005 | Coldicott et al. ............. 713/166 |
| 2006/0161502 | A1 * | 7/2006 | Cerruti et al. ................... 705/71 |

(Continued)

OTHER PUBLICATIONS

Mao et al., Application-Oriented Document Processing Supported by Knowledge Database, Soft Computing in Industrial Applications, 2005. SMCia/05. Proceedings of the 2005 IEEE Mid-Summer Workshop on, 2005, pp. 226-231.*

(Continued)

*Primary Examiner* — Luu Pham
*Assistant Examiner* — Roderick Tolentino
(74) *Attorney, Agent, or Firm* — Michael J. Nickerson; Basch & Nickerson LLP

(57) ABSTRACT

A method and system process a document having attached thereto a set of digital rights specifications, the digital rights specifications specifying constraints on the processing of the document. A workflow controller selects candidate devices, for processing the document, from a plurality of devices and determines, for each candidate device, that the device meets the digital rights specifications requirements. A set of devices are assigned to process the document from the set of devices that meet the digital rights specifications constraints. The workflow controller detects a failed device included in the assigned set of devices to process the document and determines potential candidate devices to replace the failed device. For each potential candidate device, it is determined if the potential candidate device meets the digital rights specifications requirements. A device that meets the digital rights specifications constraints is assigned to replace the failed device.

12 Claims, 3 Drawing Sheets

(56) References Cited

U.S. PATENT DOCUMENTS

2007/0006327 A1    1/2007    Lal et al.
2007/0133047 A1*    6/2007    Matsueda .................... 358/1.15
2007/0136087 A1*    6/2007    Yamaguchi ....................... 705/1
2008/0235158 A1    9/2008    Manchala et al.
2008/0320543 A1*    12/2008    Wang et al. ................... 725/131
2010/0110465 A1*    5/2010    Ferlitsch et al. ............. 358/1.13

OTHER PUBLICATIONS

Brustoloni et al., Evaluating the usability of usage controls in electronic collaboration, Symposium on Usable Privacy and Security (SOUPS) 2008, Jul. 23-25, 2008, Pittsburgh, PA USA, pp. 1-8.*

* cited by examiner

METHOD FOR DOCUMENT PROCESSING

BACKGROUND AND SUMMARY

Processing of documents is often associated with certain conditions or requirements that a user desires to be observed while the processing takes place. When the processing of the document takes place at a location that is remote from the originator of the document and the user desires certain conditions or requirements to be observed, a mechanism should be in place to ensure that these certain desired conditions are observed.

As an example, in a secure check printing scenario, check disbursement information is received by a workflow controller via a network, printed in a secure location on a certain secure printer, inserted into envelopes, addressed, sealed, stamped, and mailed. During the processing, the requirement that the processing takes place in a secure location, perhaps monitored by properly vetted personnel is important to the issuer of the document.

Many other, similar, examples exist. Documents often need to be processed in a way that is sensitive to the location where the documents are processed. The documents may need to be processed with rigid schedule constraints or with constraints on the use of expensive resources.

Processing of documents may require more than one device or process step to occur. In order to properly process a document, the document is often first submitted to a workflow controller that plans the sequence of devices and process steps that are to take place. The workflow plan must take into account the unique requirements that are imposed on the document processing. Furthermore, the workflow must ensure that each device or process step satisfies the unique requirements attached to the document.

However, during the processing of a document with a set of unique requirements, a failure of one or more of the processing elements may occur. In such a case, the workflow must be re-planned to account for the failure. Such a re-plan of the workflow must ensure that any replacement processing elements also meet the unique requirements.

For example, a document could require that the processing takes place in a secure location with personnel having proper levels of security clearance. If, during processing, a secure printer fails, the workflow controller looks for other devices that could perform the job of printing. The workflow controller verifies if the replacing device has sufficient rights to be included into the workflow; i.e., if the replacing device is also a secure printer with similar capabilities, the replacing device is located in a secure facility, the operator(s) of the replacing device have the necessary security clearance; and that the replacing device is not just any other printer. The capability matcher may also verify that the replacing device is indeed located in a certified secure environment if the replacing device happens to be geographically located at another place.

Therefore, it would be desirable to have a process that accepts a document with an attached rights specification identifying constraints on the processing of the document, submits the document to a workflow controller for processing, where the workflow controller selects candidate devices for processing, and, for each candidate device, the workflow controller determines if the device meets the rights specification. It would also be desirable for the process to assign a set of devices to process the document from the set of devices that meet the rights specification requirements, to submit the document to the selected devices, and further upon failure of one of the selected devices, the workflow controller selects one or more alternative devices, wherein all alternative devices meet the rights specification requirements before submitting the document to the revised workflow.

BRIEF DESCRIPTION OF THE DRAWING

The drawings are only for purposes of illustrating various embodiments and are not to be construed as limiting, wherein.

DETAILED DESCRIPTION

Figure 1:
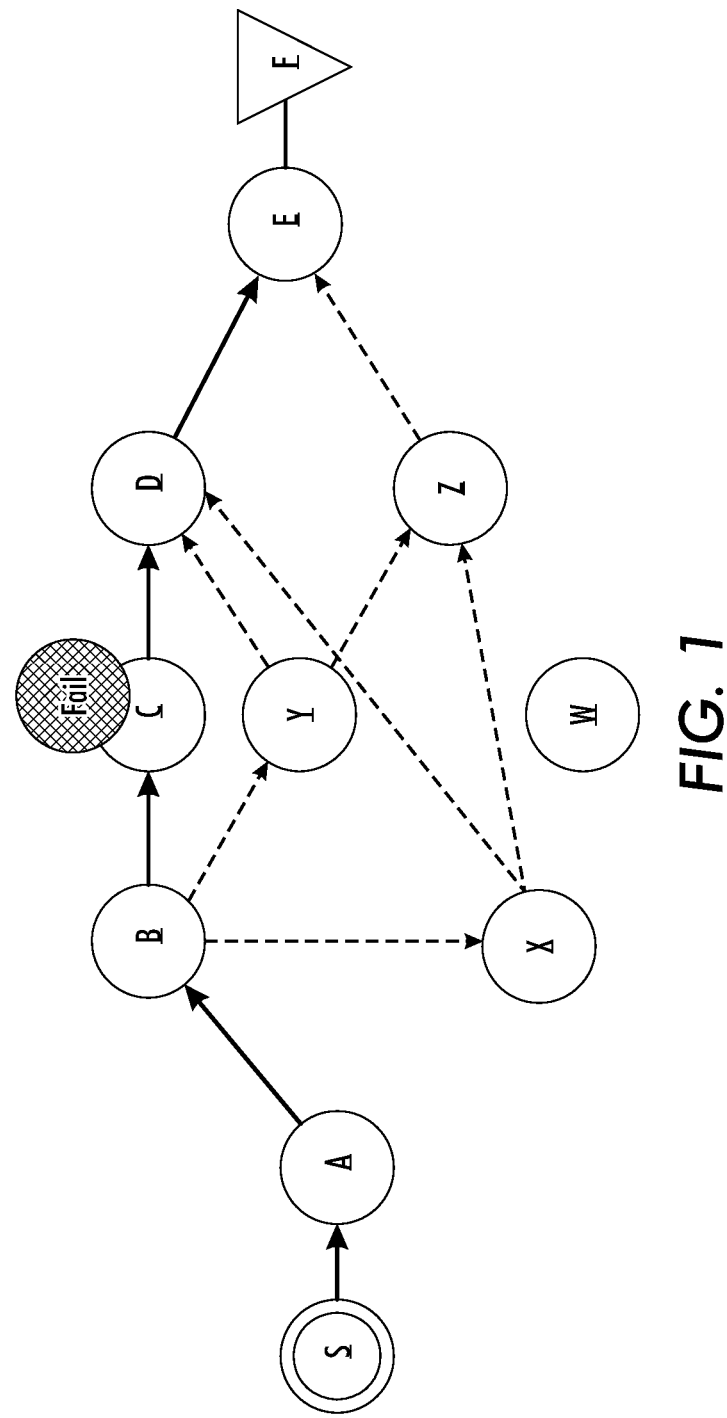
FIG. 1 is a block diagram illustrating a document processing workflow.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

FIG. 1 is a block diagram illustrating the workflow for processing a document in the form of a directed graph. Each node of the graph represents a step or device in the document processing. For example, a node might represent processing by a printer or a collating device. The directed sequence of nodes represents the sequence of operations to take place (and corresponding devices) to process the document.

As illustrated in FIG. 1, the first node S in the process represents the submission of a document to a workflow controller. A workflow controller is a device or process that identifies all the subsequent steps necessary to process the submitted document. The document submitted to the workflow controller has a specification of the processing steps that are required attached thereto. These specifications may be written in a specialized computer language.

Alternatively, the document may have a specification of the final output form attached thereto and the workflow controller identifies the specific steps and order thereof to produce the desired output.

With respect to FIG. 1, the workflow controller plans a route for the document that consists of S→A→B→C→D→E→F. Nodes A through F represent some stage of processing.

For example, node A could represent a process and output manager; node B could represent a digital front end; nodes X, Y, W, and C could represent printers; nodes D and Z could represent post print finishers; and node E could represent mail and fulfillment.

It is noted that the document processing may include processing steps such as: folding, collating, envelope insertion, and/or mailing.

In the description below, it should be understood that the use of the terms "devices" or "steps" may include steps that are performed manually wherein the manual step or steps may be required to meet the digital rights specification, for example, a security clearance requirement on any personnel that handles the document.

During the planning phase, the workflow controller determines if all the processing at nodes "A" through "F" meet any requirements derived from the digital rights specification attached to the document. The planning process may also consider scheduling and cost constraints. Finally, the planning process may take into account the requirements derived from the digital rights specification attached to the document.

For example, if these requirements derived from the digital rights specification attached to the document include the need for processing in a secure location, the workflow controller should ensure that the selected nodes meet these security constraints as well. Once the set of nodes has been identified, the document is submitted to the first node to initiate processing. During the processing, the workflow controller may check on the progress of the document through the production process.

However, it is possible that one of the nodes may fail during processing the document, or while the document is being processed by a preceding node. Such a failure requires a re-plan of the work process. The failing node can signal to the workflow controller that it has failed, or alternatively, the workflow controller can check the progress of the document processing by inspecting the node's status.

It is noted that if a node has been compromised, failure signals may prevented from being sent to the workflow controller. In such a case, the only method of identifying that a certain node has failed is by checking with the next node in the workflow at a pre-determined time for arrival of jobs, or by directly inquiring of the potentially failing node.

For example, when a node such as C fails, as indicated by the "Fail" in FIG. 1, the workflow controller identifies other nodes that can take over the work of node C. In this explanation, it is assumed that nodes W, X and Y are potential candidates to replace failed node C As noted above, the workflow controller ensures that each device or process step meets the requirements derived from the digital rights specification attached to the document.

As illustrated in FIG. 1, node W meets the processing needs of the document; however, node W does not meet the requirements derived from the digital rights specification attached to the document and hence is rejected by the workflow controller as unsuitable for processing the document.

Two potential alternate routes are shown in FIG. 1. The potential routes are S→A→B→Y→D→E→F or S→A→B→X→Z→E→F. In such a situation, all devices or steps in either potential alternate route meet all the requirements for processing the document and also the requirements derived from the digital rights specification attached to the document. The workflow controller may also identify other replaceable nodes such as using the node Z over node D to gain better throughput as disclosed in co-pending Published US Patent Application 2008/0235158 (U.S. patent application Ser. No. 11/725,873, filed on Mar. 20, 2007). The entire content of co-pending U.S. patent application Ser. No. 11/725,873 is hereby incorporated by reference.

More specifically, workflow controller may also identify other replaceable nodes such that busy non-failed nodes may be replaced by other non-busy nodes to get better throughput. The workflow controller then decides which of the alternate routes to use based on suitability of the requirements derived from the digital rights specification attached to the document.

Figure 2:
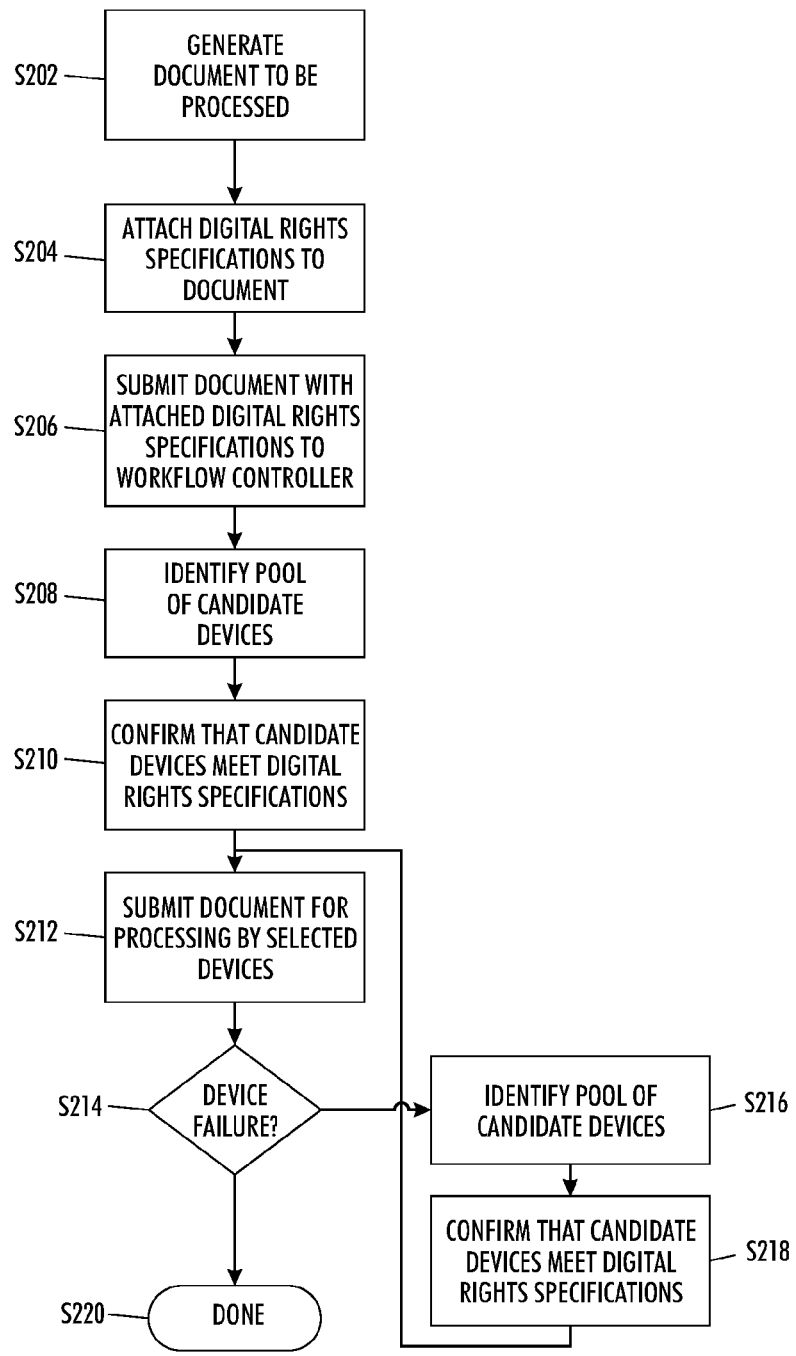
FIG. 2 is a flowchart illustrating an example of a document processing workflow.

FIG. 2 shows a process flow diagram that covers the dynamic process described above. In step S202, a document is generated. The generation process may also include generating a specification for the processing in any specialized processing control language if needed.

In step S204, any additional requirements are attached to the document in digital form. If the document itself is digital, the attached rights specification may also in digital form. If the document is some form of hardcopy, the digital rights specification may be generated in an alternative form; e.g. data glyphs; that can be used in the document processing system.

In step S206, the document, with the attached digital rights specification, is submitted to the document processing system. In step S208, the workflow controller examines the document and any processing specifications to identify the set of processing steps needed to completely process the document. This identification includes identifying the devices or processes that must be applied to the document, the order thereof, and any schedule or resource requirements that must be met. The set of processing steps is then translated into a list of candidate devices that are needed to process the document.

In step S210, the set of candidate devices is further examined to identify those devices that meet the requirements derived from the digital rights specification attached to the document. All devices that do not meet these requirements are removed from the pool. A final set of devices and a processing order is then generated and the document is submitted for processing in step S212.

If there is a device failure during processing, it is identified in step S214 and control of the document processing transfers to step S216. In step S216, a pool of candidate devices is identified that can finish the processing of the document from the last step that was completed. The pool of devices is examined to eliminate those devices that do not meet the requirements derived from the digital rights specification attached to the document.

A replacement set of devices is identified in step S218 and the document is resubmitted at step S212 for completion of the processing. When processing is completed without any device failure, the process exits at step S220.

When a device fails during processing, the state of the document and its processing may be transferred to a replacement device or devices. This transfer of state should ensure job integrity. A sequence of such steps in shown in FIG. 3.

Figure 3:
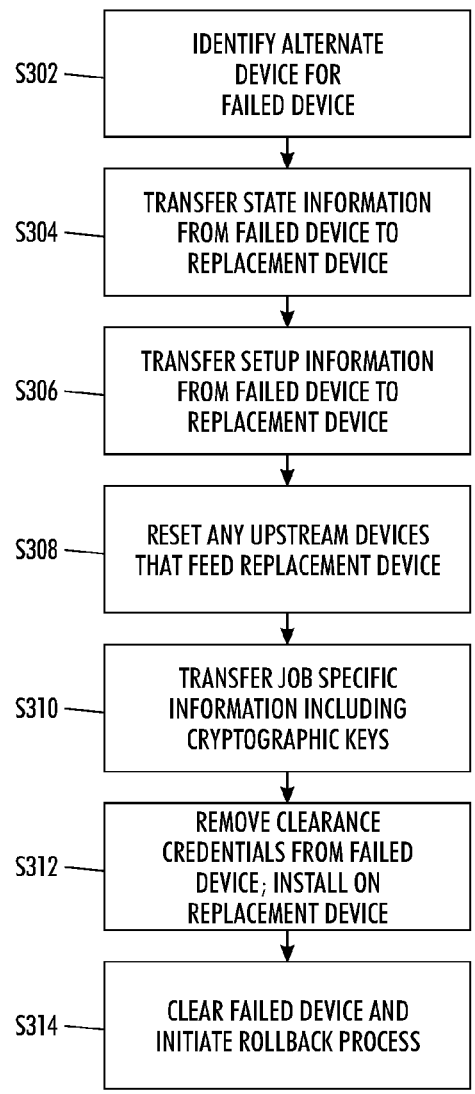
FIG. 3 is a flowchart illustrating another example of a document processing workflow.

In step S302, as illustrated in FIG. 3, a new device is identified that replaces the failed device. The replacement device must match the "static" capabilities of the failed device. These "static" capabilities may include an ability to perform encryption and decryption to meet security needs, the location of the device in a secure environment, print features like color or duplex capability or others. The replacement device must also match the "dynamic" capabilities of the failed device such as availability of particular paper stock of the right size and finish, or other specialized features such as envelopes.

The state information is transferred to the replacement device in step S304. Such state information might include any identification numbers on documents to be printed; for example, a check number if checks are being printed.

In a variable printing application, if documents are printed sequentially with respect to the data records that appear in the input data set, the sequence number (for example, the check number) is stored in a state information vector.

If the documents are printed for example in a manner wherein data records of documents are aggregated together based on a certain criterion as in documents to be mailed to a certain zip code, the method of aggregation along with the offset within the aggregation is stored in the state information vector.

Other kinds of aggregation that might be used include 'due date for payments,' 'birthday, anniversary day, or wedding day,' 'alphabetical order of last name,' etc. In most cases, data is already sorted according to the aggregation model used.

In other cases, data may be statically stored in a data base, and SQL statements can be used to dynamically retrieve a sorted list that is used in the variable printing application.

In the dynamic case, a pointer to the data record in the list is stored in the state information vector, and the same SQL statements are replayed from the new device and the pointer is used to restart the job. The position where the job is restarted is called the print check point.

In step S306, any setup information is transferred to the replacement device. Such setup information may include any color management information or color space profiles for the document.

In step S308, any upstream devices ahead of the replacement device are reset. For example, a failed printer is often fed by a digital front end processor that converts the document to a format that matches the printer. If the printer is replaced, the digital front end may need to reprocess the document to generate proper printing instructions for the replacement printer.

In step S310, any job specific information is transferred from the failed device to the replacement device. Such information might include any cryptographic keys needed to decrypt any restricted data in the document.

In step S312, any clearances or credentials needed to obtain resources are removed from the failing device and transferred to the replacement device by the workflow controller. This transfer enables access to some of the resources that may have required previous payment by the user and the new device must have clearance to obtain these resources.

In step S314, the failed node is cleared of all secure information. Furthermore, it may be necessary to back up the processing flow and reprocess some parts of the document in a roll-back step.

For example, in a variable printing application that is printing checks, it may be necessary to reprint a certain number of the previously printed documents. The clearance step S314 identifies any such roll-back and further ensures of which any duplicate or extra material is properly disposed.

An example of such a roll-back technique is disclosed in U.S. Pat. No. 6,088,119. The entire content of U.S. Pat. No. 6,088,119 is hereby incorporated by reference.

The process described above ensures that the processing of the documents meets requirements imposed by the user even if the processing is carried out at a remote location. By use of third party certification authorities, the user can be assured that any remote devices comply with requirements that may not be part of a traditional document processing specification. For example, while a traditional specification might specify a paper type or color processing, the current process can include such non-traditional requirements as security access.

An access control works as follows. A user that wishes to process a document on a certain device or system first gets authenticated to the system, whereby the system determines the identity of the user, and hence can verify that the user has sufficient privileges to perform the requested action.

For example, when a request to perform the action is received by the system, the system consults an access control list that defines what operations or actions are permissible for that user. Common users that share the same set of access rights are combined into groups to reduce the length of the access control list. A certain class of these common users is given a certain classification or a role and the resulting method of access control is commonly referred to as role based access control.

Apart from the user identity and action that the user intends to perform, additional constraints are also imposed by the system. These constraints include access timings, number of units of usage per interval, number of accesses per payment, etc.

Examples of the imposition of these constraints are disclosed in U.S. Pat. No. 4,977,594 and U.S. Pat. No. 5,247,575. The entire contents of U.S. Pat. No. 4,977,594 and U.S. Pat. No. 5,247,575 are hereby incorporated by reference The inclusion of these constraints to the access control list is referred to as digital rights management. Often, digital rights management employs a technique called digitally signed capability that a user carries along with the request. This capability carries with it all the rights that a user is allowed to perform on the system. The system verifies the signature on the capability before allowing the user to perform any operation.

In the process described above, the process verifies that the system meets requirements imposed by the user. In other words, the system workflow controller, acting on behalf of the user, verifies that the processing devices meet any requirements imposed by the user.

The workflow controller may contain a component (a capability matcher) that compares the rights requirements of the user or the requirements derived from the digital rights specification attached to the document to the capabilities of candidate devices in the workflow. The workflow controller's capability matcher acts on behalf of the user to verify if the selected node meets the rights requirements of the user or the requirements derived from the digital rights specification attached to the document.

The capability matcher verifies the validity of the services that the replacing node provides using conventional digital signature verification techniques. Such services may be certified by third parties such as Verisign™. The user's digital rights requirements are then matched one to one by superimposing the rights requirements of the user to the rights credentials of the device by taking into account any rights subsumption; i.e., if a user requires level 3 security and if a node (device or center or facility) provides higher level 4 security, level 4 subsumes level 3 security by providing additional security.

Once such matching is done, any additional constraints that come along with the altered workflow are considered to verify if the additional constraints can be satisfied.

For example, if the new node provides level 4 security at an additional cost, the workflow controller can consider if that would be acceptable. Similarly if the new node delays by a certain amount time, the workflow controller needs to consider that as well. Also, if the newer node provides a partial match, the capability matcher determines if other nodes could be added to complete the missing requirements.

The digital rights may be attached to the document in a way that ensures that the digital rights cannot be modified so that the user can be assured that the restrictions imposed by the requirements are not circumvented. The rights can be packaged with the document in a digital form.

By allowing a user to send the digital rights capability along with an encrypted document, the document gets rendered on the device (computer screen, printer, TV, music player) once the decryption key is obtained after access rights are verified. Other technology has extended the concept of digital rights from electronic documents to paper documents. Paper documents can contain digitally encoded information in the form of either visible or invisible marks such as glyphs, barcodes, radio-frequency identification devices, or glossmarks.

It is noted that different parts of the document may have different sets of requirements. This will affect the workflow re-planning in case of a device failure.

For example, if a requirement is that the document be printed using a particular paper stock and folded and mailed once the document is printed, the requirement on the paper stock is no longer applicable if the folding and mailing phases of the document processing need to be re-planned.

It is also noted that a user, who submitted the document, may verify that the document processing met the digital rights requirement constraints. By adding to the document a digital rights proof package that carries the rights verification from each stage of the document processing and returning the digital rights proof package to the user, the compliance with the user's rights requirements can be verified.

The process of FIG. 2 that includes the development of a digital proof package as the document is processed can be modified to include the building of a digital proof package as the document is processed. The process assumes that each device or step in the document processing is issued a certificate by a third party authority. Such a certificate certifies the identity of the device and the rights or properties assigned to it.

As the document is processed by each node in the processing chain, a cumulative signature is built up. A cumulative signature is one in which some data is signed by each node and the entirety is signed by another node. In essence, as the document proceeds through the process, each node adds a copy of its certification to the proof package and then encodes the cumulative page with its private key.

Thus, at the end of processing, the proof package contains a copy of the certificate for each step of the processing encoded in reverse order of processing. The proof package also contains a sequential list of the devices that processed the document.

The user can verify that the right requirements were met by using the public keys of each device in the processing chain to successively decode the proof package. By applying the public key of the last device to process the document, the user can verify that it met any right requirements that had been imposed on the document. The certification for that device is removed from the proof package and the public key of the preceding device is now used to decode the package again. The process repeats recursively until the entire chain of devices has been examined and the satisfaction of the rights requirements is verified for all devices.

For example, in a secure check printing situation, disbursement check information may be received by a system capable of fulfilling the secure check printing process, printed in a secure location on a certain secure printer, inserted into envelopes, addressed, sealed, stamped, and mailed. If the secure printer fails, the workflow controller may look for other devices that could perform the job of printing.

The workflow controller verifies if the replacing device has sufficient rights to be included into the workflow; i.e., if the replacing device is also a secure printer with similar capabilities, the printer is located in a secure facility, the operators have the necessary security clearance, and that the replacing device is not just any other printer The workflow controller may also verify that the replacing device is indeed located in a certified secure environment if the replacing printer happens to be geographically located at another place.

At the completion of the job, the user is sent a proof that the rights requirements were indeed carried out even though a new printer was put in place of a faulty one.

The same situation may apply if the workflow is dynamically negotiated on a peer to peer basis rather than controlled by a centralized workflow controller. Proof is provided in the same way, and may be verified later by a separate auditing system not established by the dynamic workflow itself, in the absence of a centralized workflow system. A more detail example is discussed below wherein it is assumed that there is no difference, for the purpose of the discussion, between a peer-to-peer workflow case and a centralized workflow controller case.

Using FIG. 1 as a basis for the discussion, let a normal route for a certain document consist of S→A→B→C (Fail) →D→E→F, wherein (Fail) indicates a node that has failed. The workflow controller may identify other nodes that can take over the work of node C. For this example, it is assumed that the new route is S→A→B→X→Z→E→F adding two nodes X and Z instead of C and D.

When a workflow is created by a workflow controller or when the workflow is altered because of a faulty node, a proof may be submitted to the user at the end of the workflow, proving that the workflow was indeed carried out faithfully as was intended and the rights requirements were not violated when a faulty node was replaced by a viable node. Each node in the workflow is issued a certificate by an authority which certifies the identity, and the specific rights assigned to that node.

Let $V=\{v_1, v_2, \ldots, v_n\}$ be a partially ordered set of intents the user desired to be performed on a document described in a language, such as job definition format. Let each of the intents be associated with certain rights requirements $R=\{r_a, r_b, \ldots r_k\}$.

When a workflow controller creates a workflow, the workflow controller specifies the workflow in the form of an ordered graph $G=(V, E)$, along with a function $f:V\to R$ where each of the intents carries along with it certain rights requirements. Before a workflow is run, the workflow controller may present this specification to the user who signs it to create a service level agreement.

As the workflow runs through the graph G, the workflow acquires the cumulative signature of every node. A cumulative signature is one wherein some data is signed by a node and the entirety is signed by another node.

It is noted that the certificate used by each node may be issued by a trusted authority which embeds in the issued certificate the identity of the node and a statement of the rights assigned to it. These rights can then be inferred and verified from the signature created using the certificate.

Moreover, it is noted that the proof certificate may be modified with additional information, other than rights compliance information. The additional information could include information noting the successful completion of the processing by the device, identification of the document, parameter settings of the device, security (rights) compliance of the device, etc.

When a node fails, the function f must be preserved by the replacing node along with the ordering of the graph G. The signature process proceeds as usual.

At the end of the workflow, this proof is given to the user. The user uses the public keys of the nodes visited in the reverse order, verifies, throws the outer signature out, and continues in the verification until all the signatures in the chain are verified, and all the rights requirements match the rights capabilities. When either a signature fails (order is not preserved) or a match fails (rights are not preserved), a violation occurs and the job can be rejected.

Another issue is preserving print integrity at a document level when workflows are re-planned due to device failure, data failure, or rights failure in an environment with parameters that change in real-time. An example of a method preserves print integrity of a job in a workflow system by transferring state information, rights information through signed delegation, set up information and variable data information from a defunct device to the new device will be explained below.

In this example, the process involved in print integrity preservation includes searching for a new device with capabilities that match the static and dynamic requirements, verifying the rights capabilities of the device, resetting the parameters at the node ahead of the device in the workflow and cleaning up of the defunct node. Techniques may also be used to create print checkpoints and rollbacks due to the nature of long running transactional or promotional print jobs.

It is assumed that one of the requirements is transactional integrity in variable printing. In this situation, the printer needs to make sure that the exact number of documents has been printed for each of the unique customers with variable data such as corporate logo, greetings, promotional items, etc. In addition, there is a requirement that each of the customers might be sending (mailing) the cards to various recipients with personalized data based on such characteristics as age, income, spending habits, etc. One technique to verify that exactly the required number of cards have been printed and mailed may use a bar code reader that scans each document as it is processed.

The transactional integrity also needs to be maintained if a print device fails. The preserving transactional integrity becomes complex if the variable data is sent in XML format using XML encryption because the keys have to be re-directed to another print device. The complexity further increases when digital rights are necessary to print certain documents using expensive resources like glossy paper, color toner, specialized fonts and images.

When node failures occur, a workflow controller may re-plan a workflow that may include new devices (such as printers, digital front ends, output managers, process managers, etc).

Examples of node failures include a printer failing (toner out, stuffing envelopes run out, electrical or mechanical failures, network connectivity lost due to software failure, network card failure, etc); the printer unable to commit on completing the job (due to a high priority job arriving at the printer); the printer is no longer available, although it works (print premises is locked and so print output is not available after 5 PM); printer trips on rights failure (printing is permitted till a specific time such as 5 PM); and/or data fails (pre-flight software detects errors and by the time it is fixed, the planned device is no longer available).

To address these node failures, the workflow controller may identify a new device is identified to take over the work of the faulty device after matching static capabilities for security (digital rights are verified, certifications are verified, ability to perform encryption and decryption are verified, secure environments are verified, etc); print features like color, duplex; output features like stapling and etc., as well as dynamic capabilities like availability of envelopes with right size, color, window for address, and etc. The state information is captured from the old device and transferred to the new device. This information includes for example, cheque number the process stopped at, greeting card record number, job identification or number, priority, service level agreement based on quality of service parameters etc. In a variable printing application, if documents are printed sequentially with respect to the data records that appear in the input data set, the sequence number (for example, the cheque number) is stored in the state information vector.

If the documents are printed, for example, in a manner wherein data records of documents are aggregated together based on a certain criterion as in documents to be mailed to a certain zip code to be aggregated and printed, the method of aggregation along with the offset within the aggregation is stored in the information vector. Other kinds of aggregation used are 'due date for payments', 'birthday, anniversary day or wedding day', 'alphabetical order of last name', etc.

It is noted that data may be already sorted according to the aggregation model used or statically stored in a data base wherein SQL statements are used to dynamically retrieve a sorted list that is used in the variable printing application In a dynamic case, a pointer to the data record in the list may be stored in the state information vector wherein the same SQL statements are replayed from the new device and the pointer is used to restart the job Furthermore, to address these node failures, set up information may be adjusted (for example using color management software and color profiles), and the node ahead of the new device may be re-set with new information so that a failed job can continue as if the failure never occurred.

It is noted that job information may be transferred to the new device (for example, cryptographic keys are transferred to the new device by the workflow controller so that private data can now be decrypted by the new print device), and credentials useful for obtaining resources may be delegated by the workflow controller so that the resource manager (such as a database, document repository, etc.) may examine the delegated credentials and release the necessary resources. In this case, a new print device has delegated authority from the workflow controller or even the user to act on behalf of the user and obtain the resources wherein the user has previously paid for or obtain the permission to utilize the resources.

It is further noted that the old node may be cleaned up to remove secure information and duplicate printed material.

As discussed above, a proof package may be developed during the document processing stage. In this process, a device adds a copy of its digital certificate to the proof package. This certificate may identify the device, the certifying agency, and the rights possessed by the device. The device may use its private key to encode the proof package. The encoded proof package may already contain the previously encoded certifications of any devices that have already processed the document.

These steps are carried out by each device in the processing or workflow chain. When the document processing is complete, the complete proof package may be sent to the user for rights compliance verification.

Upon receiving the complete proof package, a rights compliance verification process may be executed. In verifying compliance, a user may obtain the public key for the last device to process the document. Using this key, the user decodes the proof package to obtain a clear copy of the certification for the last device in the chain. Thereafter, the user examines the decoded certificate and verifies that the device certification contains proof that the device met all rights requirements that had been attached to the document.

It is noted that the verification process may be done manually by the user, or alternatively, the verification process may be executed by a computer aided process that examines the encoded proof package in conjunction with the original rights specification and confirms that each device meets the rights requirements by recursively decoding the proof package and comparing the rights possessed by the device with those listed in the rights specification.

In summary, a method and system processes a document by generating a document to be processed; attaching, to the document to be processed, a set of digital rights specifications, the digital rights specifications specifying constraints on the processing of the document; submitting, the document to be processed, to a workflow controller for processing wherein the workflow controller selects candidate devices, for processing the document to be processed, from a plurality of devices; determining, for each candidate device, that the device meets the digital rights specifications requirements; assigning a set of devices to process the document from the set of devices that meet the digital rights specifications constraints; and submitting the document to the selected devices.

It is noted that the determining of each candidate device meeting the digital rights specifications constraints may include verifying capabilities of the devices with a trusted third party verification service. Moreover, it is noted that the assigning of a set of devices to process the document from the set of devices meeting the digital rights specifications constraints may include determining an availability with respect to using a candidate device, a time cost with respect to using a candidate device, a financial cost with respect to using a candidate device, and/or a reliability cost with respect to using a candidate device wherein the reliability cost may include information about the stability of the device; i.e., the devices operational history.

Moreover, a method and system processes a document by generating a document to be processed; attaching, to the document to be processed, a set of digital rights specifications, the digital rights specifications specifying constraints on the processing of the document; submitting, the document to be processed, to a workflow controller for processing wherein the workflow controller selects candidate devices, for processing the document to be processed, from a plurality of devices; determining, for each candidate device, that the device meets the digital rights specifications requirements; assigning a set of devices to process the document from the set of devices that meet the digital rights specifications constraints; submitting the document to the selected devices for processing; detecting a failed device included in the assigned set of devices to process the document; determining potential candidate devices to replace the failed device; determining, for each potential candidate device, that the device meets the digital rights specifications requirements; and assigning a device to process the document from the set of potential candidate devices that meet the digital rights specifications constraints to replace the failed device.

It is noted that the determining of each candidate device meeting the digital rights specifications constraints may include verifying capabilities of the devices with a trusted third party verification service. Moreover, it is noted that the assigning of a set of devices to process the document from the set of devices meeting the digital rights specifications constraints may include determining an availability with respect to using a candidate device, a time cost with respect to using a candidate device, a financial cost with respect to using a candidate device, and/or a reliability cost with respect to using a candidate device wherein the reliability cost may include information about the stability of the device; i.e., the devices operational history.

It is also noted that the current state information of the failed device may be transferred to the device assigned to replace the failed device and/or document information and digital rights information from the failed device can be removed.

Furthermore, a method and system processes a document and verifying the processing thereof by generating a document to be processed; attaching, to the document to be processed, a set of digital rights specifications, the digital rights specifications specifying constraints on the processing of the document; submitting, the document to be processed, to a workflow controller for processing wherein the workflow controller selects candidate devices, for processing the document to be processed, from a plurality of devices; determining, for each candidate device, that the device meets the digital rights specifications requirements; assigning a set of devices to process the document from the set of devices that meet the digital rights specifications constraints; submitting the document to the selected devices; generating a proof certificate the proof certificate including information to identify the device which processes the document and characteristics thereof; modifying the proof certificate, at each device to process the document, with information identifying each device and characteristics thereof so as to create a job proof certificate upon modification by a last device to process the document; and comparing information in the job proof certificate with the specified constraints on the processing of the document to verify that the specified constraints on the processing of the document were met.

It is noted that the determining of each candidate device meeting the digital rights specifications constraints may include verifying capabilities of the devices with a trusted third party verification service. Moreover, it is noted that the assigning of a set of devices to process the document from the set of devices meeting the digital rights specifications constraints may include determining an availability with respect to using a candidate device, a time cost with respect to using a candidate device, a financial cost with respect to using a candidate device, and/or a reliability cost with respect to using a candidate device wherein the reliability cost may include information about the stability of the device; i.e., the devices operational history.

It is also noted that the current state information of the failed device may be transferred to the device assigned to replace the failed device and/or document information and digital rights information from the failed device can be removed.

It is further noted that the information representing the characteristics of the device may include device security information, device print features information, and/or device finishing features information.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for document processing comprising:
   generating a document to be processed;
   attaching, to the document to be processed, a set of digital rights specifications, the digital rights specifications specifying security constraints on the processing of the document;
   submitting, the document to be processed, to a workflow device for determining a workflow of devices to serially process the document;
   selecting, by the workflow device, a set of candidate devices, for processing the document to be processed, from a plurality of devices;

determining, by the workflow device, for each candidate device of the set of candidate devices, if the candidate device meets the security constraints of the digital rights specifications;

assigning, by the workflow device, a set of selected devices to create a workflow of devices to serially process the document from the set of candidate devices that meet the security constraints of digital rights specifications;

submitting, by the workflow device, the document to a first device of the set of selected devices;

printing, by the first device of the set of selected devices, a hardcopy of the document;

post-printing non-printing processing, by a second device of the set of selected devices, the document printed by the first device of the set of selected devices;

determining, by the workflow device, if a device of the set of selected devices has failed;

selecting, by the workflow device, a replacement device from the set of candidate devices that meet the security constraints of digital rights specifications; and assigning, by the workflow device, the replacement device to the set of selected devices to create a new workflow of devices to serially process the document.

2. The method as claimed in claim 1, wherein the determining of each candidate device meeting the security constraints of digital rights specifications includes verifying capabilities of the candidate devices with a trusted third party verification service.

3. The method as claimed in claim 1, wherein the assigning of a set of selected devices to process the document from the set of candidate devices meeting the security constraints of digital rights specifications includes determining an availability with respect to using a candidate device.

4. The method as claimed in claim 1, wherein the assigning of a set of selected devices to process the document from the set of candidate devices meeting the security constraints of digital rights specifications includes determining a time cost with respect to using a candidate device.

5. The method as claimed in claim 1, wherein the assigning of a set of selected devices to process the document from the set of candidate devices meeting the security constraints of digital rights specifications includes determining a financial cost with respect to using a candidate device.

6. The method as claimed in claim 1, wherein the assigning of a set of selected devices to process the document from the set of candidate devices meeting the security constraints of digital rights specifications includes determining a reliability cost with respect to using a candidate device.

7. A system for processing a document comprising:

a workflow controller device to receive a document to be processed, the document having attached thereto a set of digital rights specifications, said digital rights specifications specifying security constraints on the processing of the document; and a plurality of document processing devices which provide services, in a serial manner, to process a document;

said workflow controller device selecting a set of candidate devices for processing the document to be processed, said set of candidate devices being selected from said plurality of document processing devices;

said workflow controller device determining, for each candidate device of the set of candidate devices, that the candidate device meets the constraints of digital rights specifications and creating a set of verified candidate devices that meet the security constraints of digital rights specifications;

said workflow controller device creating a workflow process by selecting a set of document processing devices to process the document from the set of verified candidate devices and assigning the selected set of document processing devices to the workflow process;

said workflow controller device submitting the document to a first document processing device of the selected set of candidate devices assigned to the workflow process;

said first document processing device of the selected set of candidate devices printing a hardcopy of the document and submitting the printed document to a second document processing device of the selected set of candidate devices;

said second document processing device of the selected set of candidate devices post-printing non-printing processing the printed document;

said workflow controller device determining if a device of the set of document processing devices has failed;

said workflow controller device selecting a replacement device from the set of verified candidate devices;

said workflow controller device assigning the replacement device to the set of document processing devices to create a new workflow of devices to serially process the document.

8. The system as claimed in claim 7, wherein said workflow controller device determines each candidate device meeting the security constraints of digital rights specifications by verifying capabilities of the candidate devices with a trusted third party verification service.

9. The system as claimed in claim 7, wherein said workflow controller device assigns a set of document processing devices to process the document from the set of verified candidate devices by determining an availability with respect to using a candidate device.

10. The system as claimed in claim 7, wherein said workflow controller device assigns a set of document processing devices to process the document from the set of verified candidate devices by determining a time cost with respect to using a candidate device.

11. The system as claimed in claim 7, wherein said workflow controller device assigns a set of document processing devices to process the document from the set of verified candidate devices by determining a financial cost with respect to using a candidate device.

12. The system as claimed in claim 7, wherein said workflow controller device assigns a set of document processing devices to process the document from the set of verified candidate devices by determining a reliability cost with respect to using a candidate device.

* * * * *